United States Patent
Coulter et al.

(10) Patent No.: US 6,699,313 B2
(45) Date of Patent: Mar. 2, 2004

(54) COMPOSITE REFLECTIVE FLAKE BASED PIGMENTS

(75) Inventors: Kent E. Coulter, Santa Rosa, CA (US); Thomas Mayer, Santa Rosa, CA (US); John S. Matteucci, deceased, late of Healdsburg, CA (US), Mary E. Matteucci, executor; Roger W. Phillips, Santa Rosa, CA (US)

(73) Assignee: Flex Products, Inc., Santa Rosa, CA (US)

( * ) Notice: Subject to any disclaimer, the term of this patent is extended or adjusted under 35 U.S.C. 154(b) by 0 days.

(21) Appl. No.: 10/401,198

(22) Filed: Mar. 27, 2003

(65) Prior Publication Data

US 2003/0207113 A1 Nov. 6, 2003

Related U.S. Application Data

(62) Division of application No. 09/626,041, filed on Jul. 27, 2000, now Pat. No. 6,586,098.

(51) Int. Cl.[7] ............................. C09D 17/00; B32B 5/16
(52) U.S. Cl. .................. 106/31.6; 106/31.65; 106/31.9; 106/401; 428/407
(58) Field of Search ................................. 428/327, 407; 106/31.31, 31.6, 31.65, 31.9, 400, 401

(56) References Cited

U.S. PATENT DOCUMENTS

| | | |
|---|---|---|
| 3,011,383 A | 12/1961 | Sylvester et al. |
| 3,123,490 A | 3/1964 | Bolomey et al. |
| 3,412,575 A | 11/1968 | Feldman et al. |
| 3,622,473 A | 11/1971 | Ohta et al. |
| 3,926,659 A | 12/1975 | Horst et al. |
| 3,949,139 A | 4/1976 | Dunning et al. |
| 3,962,397 A | 6/1976 | Narui et al. |
| 3,988,494 A | 10/1976 | McAdow |
| 4,116,710 A | 9/1978 | Heikel |
| 4,168,983 A | 9/1979 | Vittands et al. |

(List continued on next page.)

FOREIGN PATENT DOCUMENTS

| | | |
|---|---|---|
| EP | 351932 | 1/1990 |
| EP | 353544 | 2/1990 |
| EP | 491981 | 7/1992 |
| JP | 56-130469 A | 10/1981 |
| JP | 1-147065 A | 6/1989 |

(List continued on next page.)

OTHER PUBLICATIONS

J.A. Dobrowolski, K.M. Baird, P.D. Carman and A. Waldorf, "Optical Interference Coatings for inhibiting of Counterfeiting," Optica Acta, 1973, vol. 20. 12, pp. 925–937.

(List continued on next page.)

Primary Examiner—H. Thi Le
(74) Attorney, Agent, or Firm—Holme Roberts & Owen LLP

(57) ABSTRACT

A flake-based pigment is provided having improved specular reflectance characteristics in the visible wavelength range. The flake-based pigment has a plurality of composite reflective flakes each formed of a support layer and a reflector layer on one or both opposing sides of the support layer. This flake structure exhibits a uniaxial compressive strength much greater than a corresponding uniaxial tensile strength. The structure of the flakes provides the benefits of rigidity and brittle fracture during manufacture and application processes, which ultimately provides favorable planar and specular reflectance characteristics to the pigment in the visible wavelength range. A variety of outer coating layers can be formed around the composite reflective flakes, such as various dielectric and/or absorber layers, to produce desired optical characteristics in the pigment.

5 Claims, 6 Drawing Sheets

U.S. PATENT DOCUMENTS

| | | | |
|---|---|---|---|
| 4,213,886 A | 7/1980 | Turner | |
| 4,309,075 A | 1/1982 | Apfel et al. | |
| 4,321,087 A | 3/1982 | Levine et al. | |
| 4,434,010 A | 2/1984 | Ash | |
| 4,552,593 A | 11/1985 | Ostertag | |
| 4,629,512 A | 12/1986 | Kondis | |
| 4,705,300 A | 11/1987 | Berning et al. | |
| 4,705,356 A | 11/1987 | Berning et al. | |
| 4,721,217 A | 1/1988 | Phillips et al. | |
| 4,756,771 A | 7/1988 | Brodalla et al. | |
| 4,838,648 A | 6/1989 | Phillips et al. | |
| 4,851,095 A | 7/1989 | Scobey et al. | |
| 4,940,523 A | 7/1990 | Takeshima | |
| 4,978,394 A | 12/1990 | Ostertag et al. | |
| 5,009,486 A | 4/1991 | Dobrowolski et al. | |
| 5,059,245 A | 10/1991 | Phillips et al. | |
| 5,084,351 A | 1/1992 | Phillips et al. | |
| 5,116,664 A | 5/1992 | Kimura et al. | |
| 5,135,812 A | 8/1992 | Phillips et al. | |
| 5,171,363 A | 12/1992 | Phillips et al. | |
| 5,190,807 A | 3/1993 | Kimock et al. | |
| 5,198,042 A | 3/1993 | Masumoto et al. | |
| 5,225,057 A | 7/1993 | LeFebvre et al. | |
| 5,278,590 A | 1/1994 | Phillips et al. | |
| 5,279,657 A | 1/1994 | Phillips et al. | |
| 5,332,767 A | 7/1994 | Reisser et al. | |
| 5,356,471 A | 10/1994 | Reynders | |
| 5,364,467 A | 11/1994 | Schmid et al. | |
| 5,378,527 A | 1/1995 | Nakanishi et al. | |
| 5,549,774 A | 8/1996 | Miekka et al. | |
| 5,570,847 A | 11/1996 | Phillips et al. | |
| 5,573,584 A | 11/1996 | Ostertag et al. | |
| 5,587,207 A | 12/1996 | Gorokhovsky et al. | |
| 5,593,773 A | 1/1997 | McKay et al. | |
| 5,607,504 A | 3/1997 | Schmid et al. | |
| 5,624,076 A | 4/1997 | Miekka et al. | |
| 5,624,486 A | 4/1997 | Schmid et al. | |
| 5,629,068 A | 5/1997 | Miekka et al. | |
| 5,648,165 A | 7/1997 | Phillips et al. | |
| 5,672,410 A | 9/1997 | Miekka et al. | |
| 5,763,086 A | 6/1998 | Schmid et al. | |
| 5,766,334 A | 6/1998 | Hashizume et al. | |
| 5,766,335 A | 6/1998 | Bujard et al. | |
| 5,790,304 A | 8/1998 | Sanders et al. | |
| 5,830,567 A | 11/1998 | Panush | |
| 5,858,078 A | 1/1999 | Andes et al. | |
| 5,877,895 A | 3/1999 | Shaw et al. | |
| 6,013,370 A | 1/2000 | Coulter et al. | |
| 6,150,022 A | 11/2000 | Coulter et al. | |
| 6,157,489 A * | 12/2000 | Bradley et al. | 359/584 |
| 6,236,510 B1 * | 5/2001 | Bradley et al. | 359/585 |
| 6,376,075 B1 * | 4/2002 | Tacke-Willemsen et al. | 428/402 |
| 6,383,638 B1 | 5/2002 | Coulter et al. | |
| 6,387,498 B1 | 5/2002 | Coulter et al. | |
| 6,565,770 B1 * | 5/2003 | Mayer et al. | 252/301.36 |
| 6,569,529 B1 * | 5/2003 | Phillips et al. | 428/403 |
| 6,572,784 B1 * | 6/2003 | Coombs et al. | 252/301.16 |
| 6,582,506 B2 * | 6/2003 | Archambeault | 106/415 |
| 6,586,098 B1 * | 7/2003 | Coulter et al. | 428/403 |

FOREIGN PATENT DOCUMENTS

| | | |
|---|---|---|
| JP | 10-259316 | 9/1998 |
| WO | WO 93/12182 | 6/1993 |
| WO | WO 96/22336 | 7/1996 |
| WO | WO 96/38505 | 12/1996 |
| WO | WO 99/35194 | 7/1999 |
| WO | WO 00/34395 | 6/2000 |

OTHER PUBLICATIONS

John M. McKieman, et al, "*Luminescence and Laser Action of Coumarin Dyes Doped in Silicate and Aluminosilicate Glasses Prepared by the Sol–Gel Technique,*" Journal of Inorganic and Organometallic Polymers, vol. 1, No. 1, 87–103, 1991.

Callister WD, Jr., *Material Science and Engineering: An Introduction*, John Wiley & Sons, Inc., 91–112, 1985.

Craig R. Barrett, William D. Nix and Alan S. Tetelman, "*The Principals of Engineering Materials,*" Printice–Hall, 282–290, 1973.

Greiwe K., *Coloured Aluminum Pigments*, Eckart–Werke, Werk Güntersthal, $4^{th}$ Nümberg Congress, Paper 6, 1–7.

Jeffrey I. Zink, et al, "*Optical Probes and Properties of Aluminosilicate Glasses Prepared by the Sol–Gel Method*".

Minolta Manual for "*Precise Color Communication, Color Control From Feeling to Instrumentation,*" pp. 18, 20, 22, 23, 46, 47, 48 and 49.

The R.D. Mathis Company Manual for "*Think Film Evaporation Source Reference,*" Long Beach, CA.

The Mearl Corporation brochure for "*Mearl Iridescent Film,*" Peekskill, New York.

N.A.G. Ahmed and D.G. Teer, "*A Simple and Inexpensive Rotating Barrel to Ion Plate Small Components,*" J. Phys. E.Sci.Instrum., vol. 17, 1984, p.411–416.

Myong Ryeong Kim, "*Magnetron Sputter Deposited CoPtCr Magnetic Thin Films for Information Storage,*" Ph.D. Dissertation Thesis, Department of Metallurgical Engineering, The University of Utah, Jun. 1993.

B. Window and N., Savvides, "*Charged Particle Fluxes From Planar Magnetron Sputtering Sources,*" J. Vac. Sci. Technol. A. 4(2), Mar./Apr. 1986, p. 196–202.

B. Window, F. Sharples, and N. Savvides, "*Magnetically Confined Sputter Source with High Ion Flux,*"J. . Vac. Sci. Technol. A 3(6), Nov./Dec. 1985, p. 2368–2372.

N. Savvides and B. Window, "*Unbalanced Magnetron Ion–Assisted Deposition and Property Modification of Thin Films,*" J. Vac. Sci. Technol. A 4(3), May/Jun. 1986, p. 504–508.

D.G. Teer, "*Reactive Magnetron Sputter Barrel Ion Plating,*" Conference Proceedings IPAT 91, p. 303–308, Brussels, Belgium.

R. Hermann and G. Braüer, "*DC and RF–Magnetron Sputtering,*" and J. Becker, "*Ion Beam Sputtering,*" Handbook of Optical Properties, vol. 1, pp. 135–212, R.E. Hummel and K.H. Guenter (eds), CRC Press (1995).

Flex Products Technical Bulletin No. TB–02–98, "*Dynamic Color Area Diagram and Value,*" 1998.

Chemical Engineers' Handbook, Chemical Engineering Series, McGraw–Hill Book Company, Inc., Second Edition, 1941, pp. 2116–2123.

* cited by examiner

COMPOSITE REFLECTIVE FLAKE BASED PIGMENTS

CROSS-REFERENCE TO RELATED APPLICATIONS

This application is a divisional of U.S. Ser. No. 09/626,041, filed Jul. 27, 2000, now U.S. Pat. No. 6,586,098, which application is incorporated herein by specific reference, and claims priority thereto.

BACKGROUND OF THE INVENTION

1. The Field of the Invention

The present invention relates generally to flake-based pigments. More specifically, the present invention relates to composite reflective flake based pigments having improved specular reflectance.

2. The Relevant Technology

Pigments are generally used to contribute to the optical and other properties of coatings, inks, extrusions, paints, finishes, glass, ceramics, cosmetics, and the like. Many varieties of pigments exist, some of which are metal flake based. These metal flakes comprise a thin film metal layer for improving the lustre, sparkle, shine, absorption, hiding and/or reflective properties of the application. The optical performance of the pigments, however, is duly constrained by the inherent limitations of each metal flake therein.

In general, it is known that for the application to achieve the greatest specular reflectance across visible wavelengths (about 300–800 nm), metal flakes should individually lay as flat as possible. As a collection of numerous flakes, the greatest reflectance, and hence greatest brightness, occurs when the flakes are collectively planar oriented to expose the greatest amount of surface area of the metallic flakes to the incident light and reflect as much of that light as possible.

A major factor, however, affecting those reflectance characteristics is the size or dimensions of the flake as the flake is used in a particular application. For example, if the flakes are thick, a plurality of thick flakes combined together in an application are prevented from lying together in a generally flat or horizontal singular plane because adjacent flakes cannot easily overlap each other due to their thickness. As a result, many flakes are adversely caused to be oriented in a substantially vertical manner and the plurality of flakes do not lay with their area surfaces parallel to a common plane. Incident light then exposed upon the non-planar pigments is subject to extreme scatter and non-specular reflection. Thus, the favorable reflective properties of the application are diminished by thick flakes. To a lesser extent, thick flakes frequently cause other difficulties such as the clogging of automatic-spray paint guns during painting applications.

It is also well known that as the thicknesses of the flakes is reduced, the point is reached where the flakes become so flimsy (i.e., non-rigid or flaccid) that they begin to curl and or wrinkle. This reduction in flake planarity increases the scatter of incident light and reduces the desirable specular reflectivity. Additionally, if the flakes are too thin when applied onto a surface during applicational use, the flakes will assume any microscopic defects in the contour of that surface. For example, if that contour is rough, the flakes will correspondingly be rough or non-planar. As the flakes are distorted to conform with the surface, planarity is reduced, again increasing the scatter of incident light and reducing the desirable specular reflectivity. Some manufacturing processes form flakes from a singular, larger sheet or film of metal which is "fractured" by well known techniques into smaller, flake-sized particles.

Two types of fracture may result, "ductile" or "brittle." Ductile fractures cause the metal to undergo substantial plastic deformation near the vicinity of fracture before fracture occurs. This deformation causes numerous malformed regions having disfavorable planar characteristics to appear. As before, these malformed regions, such as regions having curled or wrinkled metal, disadvantageously tend to scatter and diffuse incident light exposed thereupon. Brittle fractures, on the other hand, tend to cause little or no plastic deformation of the metal before the fracture occurs which enables the produced metal flake to maintain, as much as possible, the original planarity of the larger metal sheet. Consequently, it is desirable that brittle fracture occur during manufacturing. However, brittle fracture does not occur with most metals having high reflectivity.

In fact, brittle fracture is only likely to occur with materials having a large compressive strength as compared to its corresponding tensile strength. This is because the internal bond strength distributed throughout a material is composed of tensile and compressive components. The tensile strength compensates for forces out of the plane of the material and the compressive strength is related to forces in the plane. Thus, similar compressive and tensile strengths will allow ductile deformations since the relative strength into and out of the plane is equivalent. In contrast, brittle deformation occurs when the compressive strength is greater than the tensile strength and the material strength is directed into the plane, not out of the plane. Consequently, a high compressive strength relative to tensile strength results in bond rupture and material cracking when a force is applied. Thus, aluminum, for example, which has a tensile strength of about 13–24 lb/in$^2$ and a compressive strength of about 13–24 lb/in, would most likely undergo a ductile fracture under a uniaxial stress which would cause the aluminum to exhibit disfavored reflective characteristics. Moreover, once the aluminum is bent or deformed, as would occur with ductile fracture, the aluminum remains deformed and the disfavored reflective characteristics would persist. Consequently, it is difficult to manufacture metal flakes, such as aluminum, without malformations that reduce reflectance.

As is well known, fracture mechanics are not only important for metal flakes during the manufacturing process, but are as equally important during use. For example, applicational processes, such as the drying of a paint or ink solvent, also induce stresses on the flake. These stresses, caused by surface tension, again cause the flake to undergo fracture or malformation. Since brittle fracture of the flake during the applicational process also tends to produce smaller flakes that maintain much of the original planarity of the larger flake, instead of curled or deformed flakes, flake planarity and reflective properties are improved. Thus, flake brittleness is a characteristic not only preferred during the manufacturing process but also preferred during the applicational use.

Prior techniques have attempted to produce thin, rigid and brittle flakes by facilitating both the manufacturing thereof and the reflective properties of the application. Yet all prior solutions have involved compromises. For example, in U.S. Pat. No. 5,198,042, it is taught to alloy the metal flake with other materials and metals to reduce the adverse curling, wrinkling and malleability of thin flakes. Alloying, however, dilutes the reflectance properties of the flake. In U.S. Pat. No. 4,213,886, a surface bound species that pulls the flake flat in a coating resin is disclosed. This method, however, requires chemical tailoring of the flake and the resin in order achieve chemical compatibility with the species. Such compatibility is difficult and has not proved to be practical.

In U.S. Pat. No. 4,629,512, flakes are floated on a resin coating. Adversely, this method submits the flake to durability attacks because the flake is unprotected. Such attacks primarily include corrosion which not only corrodes the flake but tends to give the application a mottled or discolored appearance. Additionally, if this method were used in conjunction with another resinous application, such as a clear overcoat paint, the overcoat itself would tend to disfavorably disrupt the planar orientation of the flake because of solvent penetration. Again, reflectance properties would be decreased.

In U.S. Pat. No. 5,593,773, pre-cracked flakes are disclosed having such a small aspect ratio that malformation of the flake is essentially impossible. A shrinking aspect ratio, however, also correspondingly shrinks the inherent reflectance capability of the flake. This is because, as the aspect ratio becomes smaller, there is more opportunity for flakes to become disoriented with respect to flakes having their planes aligned parallel with the substrate surface.

In U.S. Pat. No. 3,622,473, flake rigidity is increased by oxidizing the reflector of the flake to form a rigid, outer oxide layer. Whenever an oxide is used, however, the inherent reflectance properties of the flake are decreased. Additionally, oxides are typically formed at defect sites on the flakes which then tend to prevent a uniform application across the surface of the flake. This non-uniformity introduces a reduction in reflectance and can also cause a mottled applicational appearance.

Various attempts have been made to improve flake rigidity by applying singular or multiple layer coatings about the surfaces thereof. Thus far, the singular layer coatings have been so thick that reflective properties are detrimentally diminished because the coatings have greatly contributed to the scatter of light. The multiple layer coatings have induced even more scatter and adversely caused light to diffuse at the boundaries between various layers.

In addition, prior coatings have commonly been organic, which inherently have a low elastic modulus, placing a limitation on how thinly the coatings can be applied and still provide structural rigidity to a very thin metal flake. Disadvantageously, the natural thickness limitation is still so large that other applicational processes remain burdened by this thickness. Such processes include spraying the flakes through an automatic-spray paint gun. Moreover, organic coatings when applicationally used in a solvent are eventually caused to lose structural rigidity because of dissolution related effects.

More recently, Japanese published application No. 10-259316 disclosed a method of preparing highly reflective pigments by sputtering metallic thin films on the surfaces of glass flakes. The glass flakes have an average particle diameter of 10–300 microns and an average thickness of 1–20 microns, with a 50–200 angstrom titanium metal film formed thereon by a sputtering process. In Japanese published application No. 10-316883, a method of preparing highly reflective pigments is disclosed in which metallic thin films of iron or nickel alloys are sputtered onto inorganic flakes such as glass, mica, aluminum, or graphite flakes.

Although some reflective coatings exist that are rigid and facilitate brittle fracture, these coatings are unlike most of the other prior coatings because they do not use a metal flake. In U.S. Pat. No. 4,309,075, for example, multiple layer coatings are taught that merely simulate a metal flake, with alternating layers of high and low indices of refraction used to create a reflector that simulates the reflective properties of a metal flake. Another example is described in U.S. Pat. No. 3,123,490, in which a layer of ZnS is coated on a top and bottom thereof with $MgF_2$. Although rigid and subject to brittle fracture, this structure is typically thick (about 215 nm) and cannot be used in many applications requiring thin flakes. Moreover, it is often necessary to have numerous layers of alternating high-low refractive index coatings to achieve simulation of the metal flake. But as thicknesses and layers increase, manufacturing complexities and economic burdens correspondingly increase.

Accordingly, it is desirous to find alternatives for inexpensively producing a thin, rigid and brittle metal flake having improved reflective characteristics thereby improving reflectance of metal flake-based pigments.

SUMMARY AND OBJECTS OF THE INVENTION

It is an object of the present invention to provide an improved flake-based pigment containing substantially rigid thin flakes with good specular reflectance characteristics in the visible wavelength range.

It is a further object of the present invention to provide an improved flake-based pigment having thin flakes therein possessing brittle fracture properties to thereby afford improved reflectance characteristics during use.

It is another object of the present invention to provide a relatively cost-effective process of producing an improved flake-based pigment having thin, rigid and brittle flakes therein.

It is still another object of the present invention to provide an improved flake-based pigment containing flakes with a large aspect ratio.

It is yet another object of the present invention to provide an improved flake-based pigment wherein a metallic reflector of the flake is surrounded by a chemically resistant coating layer.

It is a further object of the present invention to provide flake-based pigments which may be easily and economically utilized in colorants such as paints and inks for various applications.

In accordance with the invention as embodied and broadly described herein, the foregoing and other objects are achieved by providing a flake-based pigment having a plurality of composite reflective flakes each formed of a central support layer and at least one reflector layer on either or both of the opposing major surfaces of the central support layer. The central support layer can be a dielectric material which provides a smooth, rigid support for the reflective layers. The composite reflective flakes are very thin structures that exhibit a uniaxial compressive strength much greater than a corresponding uniaxial tensile strength. This structure provides the benefits of rigidity and brittle fracture during manufacturing and application processes, which ultimately provides favorable planar and specular reflectance characteristics to the pigment in the visible wavelength range. The favorable properties of rigidity and brittleness allow easy fracture of a formed core flake film into small core flake sections during the manufacturing process without the flakes becoming curled or wrinkled. The composite reflective flakes also have a large aspect ratio, allowing for favorable reflection of substantial amounts of incident light during applicational use.

One or more coating layers can be formed around the fabricated composite reflective flakes according to various embodiments of the invention. Such coating layers can provide various desired optical characteristics to the pigment, such as color shift, color enhancement, magnetic properties, solar absorption properties, etc. Such coatings may also provide enhanced chemical resistance and durability, protecting the underlying metal layers responsible for the high specular reflectivity.

In a method of fabricating a highly reflective flake-based pigment according to the present invention, a first reflective layer is formed on an upper surface of a web material, and a dielectric central support layer is formed on the first reflective layer. A second reflective layer is then formed on the dielectric central support layer to complete a core flake film. The core flake film is then removed from the web material in order to produce a plurality of composite reflective flakes having substantial rigidity so as to provide high reflectance to the pigment. One or more coating layers are then formed around the composite reflective flakes as desired.

In an alternative method of fabricating a highly reflective flake-based pigment according to the present invention, first and second reflective layers are simultaneously deposited on the first and second major surfaces of preformed rigid flakes forming a composite reflective flake. One or more coating layers are then formed around the composite reflective flake as desired.

Other aspects and features of the present invention will become more fully apparent from the following description and appended claims, or may be learned by the practice of the invention.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered limiting of its scope, the invention in its presently understood best mode for making and using the same will be described and explained with additional specificity and detail through the use of the accompanying drawings in which.

DETAILED DESCRIPTION OF THE INVENTION

Figure 1A:
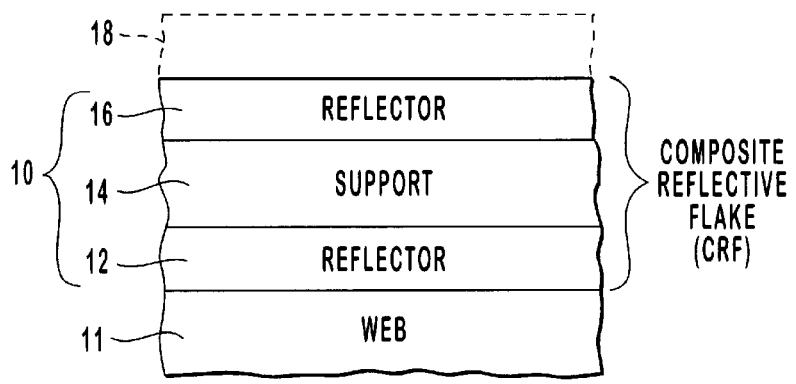
FIGS. 1A–1C are schematic cross-sectional views of alternative embodiments of composite reflective core flake films in accordance the present invention.

The present invention is directed to flake-based pigments having improved specular reflectance characteristics in the wavelength range of about 300 to about 800 nm. It is a feature of the present invention to provide a core portion of the pigment flakes with reflective outer layers, which are typically metal, on either side of a central support layer to form a core flake section. The central support layer provides rigid support and brittle fracture characteristics to the core flake section. In another feature of the invention, the core flake sections are surrounded with one or more dielectric, absorbing, and/or other optical layers, to yield a plurality of pigment particles.

Referring to the drawings, wherein like structures are provided with like reference designations, the drawings only show the structures necessary to understand the present invention.

FIG. 1A depicts one embodiment of a composite reflective core flake film for producing a highly reflective flake-based pigment of the present invention. The core flake film includes a core flake section 10 which is formed on a web 11 of a flexible material by conventional deposition processes, as discussed in further detail below. The core flake section 10 provides the structure for a composite reflective flake (CRF) which is formed from the core flake film. The core flake section 10 can have a three-layered core structure including a central support layer 14 interposed between a pair of reflector layers 12 and 16 on opposing major surfaces of central support layer 14. Alternatively, only one reflector layer 12 or 16 may be formed on support layer 14 to produce a two-layered core structure. FIG. 1A also shows that one or more thin film layers 18 (shown in phantom) such as optical coatings can be optionally formed on core flake section 10 if desired, as long as the functionality of the core flake section remains unchanged. For example various dielectric, absorber, and/or other optical coatings having thicknesses dependent upon the desired optical characteristics of the pigment can be formed on one or both sides of core flake section 10 prior to removal as flakes from web 11. These flakes can then be used in the production of optical paint flakes and in forming replicated optical coatings, or may be subjected to further coating processes to produce additional optical layers around the flakes. A replicated optical coating structure may be deposited on the surface of a substrate as disclosed in U.S. Pat. No. 4,434,010, which is incorporated by reference herein.

Figure 1B:
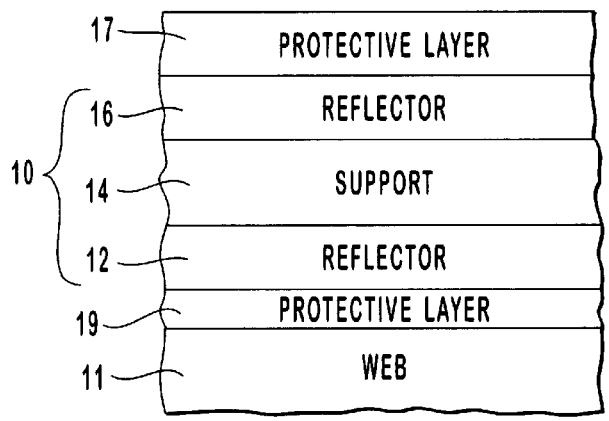

Another embodiment of a composite reflective core flake film for producing a flake-based pigment of the present invention is depicted in FIG. 1B and includes a central support layer 14 such as a dielectric layer interposed between opposing reflector layers 12 and 16. In addition, a protective layer 17 is formed on reflector layer 16 and a protective layer 19 is formed to abut reflector layer 12.

Figure 1C:
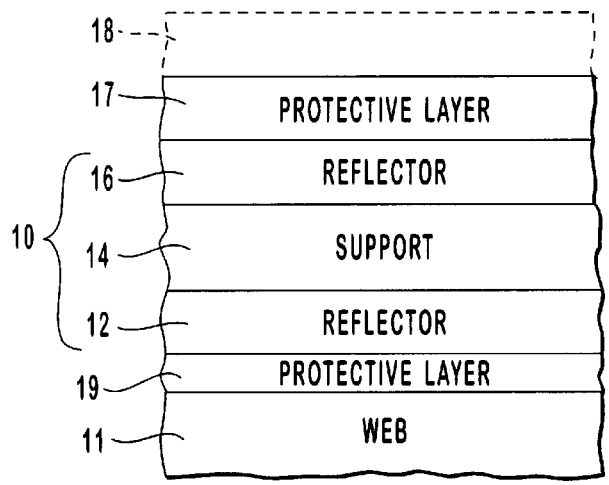

FIG. 1C shows a further embodiment of a composite reflective core flake film for producing a flake-based pigment, which includes the same features as shown in FIG. 1B, with the addition of one or more thin film layers 18 (shown in phantom) on protective layer 17. One or more thin film layers can also be formed between protective layer 19 and web 11 if desired.

A composite reflective flake according to one embodiment of the invention includes a central support layer having a top surface, a bottom surface, and at least one side surface, with the support layer composed of a substantially brittle material having a first thickness. A reflector layer having a second thickness is on each of the top and bottom surfaces but not on the at least one side surface. At least one reflector layer is composed of a substantially ductile material. The ratio of the first thickness and the second thickness is sufficient to induce a substantially brittle failure of the ductile reflector layer.

A composite reflective flake according to another embodiment of the invention includes a central support layer having substantially smooth and parallel first and second major surfaces, with a reflector layer on each of the first and second major surfaces of the support layer. At least one of the reflector layers is a continuous thin film which substantially replicates the underlying first or second major surface of the support layer.

In one preferred embodiment, a composite reflective flake of the invention includes a central support layer having a thickness in a range of about 50 nm to about 150 nm, and reflector layers on opposing sides of the dielectric layer, with each reflector layer having a thickness in a range of about 10 nm to about 150 nm.

The composite reflective flakes of the present invention provide high reflectance during use as a pigment. For example, the composite reflective flakes can have a reflectivity of greater than about 80 percent.

As discussed above, central support layer 14 of core flake section 10 can be composed of a dielectric material. The dielectric materials used are preferably inorganic, since inorganic dielectric materials have been found to have good characteristics of brittleness and rigidity. Various dielectric materials that can be utilized include metal fluorides, metal oxides, metal sulfides, metal nitrides, metal carbides, combinations thereof, and the like. The dielectric materials may be in either a crystalline, amorphous, or semicrystalline state. These materials are readily available and easily applied by physical or chemical vapor deposition processes. Examples of suitable dielectric materials include magnesium fluoride, silicon monoxide, silicon dioxide, aluminum oxide, titanium dioxide, tungsten oxide, aluminum nitride, boron nitride, boron carbide, tungsten carbide, titanium carbide, titanium nitride, silicon nitride, zinc sulfide, glass flakes, diamond-like-carbon, combinations thereof, and the like.

Alternatively, central support layer 14 may be composed of a preformed dielectric or ceramic preflake material having a high aspect ratio such as a natural platelet mineral (e.g., mica peroskovite), or synthetic platelets formed from glass, alumina, silicon dioxide, carbon, micaeous iron oxide, coated mica, boron nitride, boron carbide, graphite, and the like. The central support layer should not be construed as limited to dielectric materials, as various semiconductive and conductive materials have a sufficient ratio of tensile to compressive strength to function as a support layer for a ductile reflective material. Examples of such materials include carbon, diamond-like-carbon, graphite, silicon, metal silicides, semiconductive compounds formed from any of the group III, IV, or V elements, metals having a body centered cubic crystal structure, cermet compositions or compounds, semiconductive glasses, various combinations thereof, and the like. It will be appreciated from the teachings herein, however, that any support material providing the functionality described herein and capable of acting as a rigid layer with glass-like qualities would be an acceptable substitute for one of these materials.

The thickness of the central support layer can be in a range from about 50 nm to about 1000 nm, preferably from about 50 nm to about 150 nm, although these ranges should not be taken as restrictive. The range of coating thickness for the support layer is subject to variation based upon the actual reflector layers used and the support coating material chosen. For example, when using silicon dioxide or magnesium fluoride for the support layer, the lower thickness limit of about 50 nm is selected based upon the strength of the coating, beyond which, when smaller, will not be strong enough to maintain structural integrity (and hence flake rigidity) under the stress and strain imposed by a flexing reflector layer.

The reflector layers 12 and 16 are composed of materials that are selected to have the reflective characteristics suitable for the intended use of the pigment. A preferred reflector material is aluminum, which has good reflectance characteristics while remaining inexpensive and easy to form into a thin layer. It will be appreciated in view of the teachings herein, however, that other reflective materials may be used in place of aluminum. For example, copper, silver, gold, platinum, palladium, nickel, cobalt, niobium, chromium, tin, titanium, and combinations or alloys of these or other metals can be used as reflective materials. Other useful reflective materials include, but are not limited to, other transition metals as well as lanthanide metals, and combinations thereof. In addition, metal carbides, metal oxides, metal nitrides, metal sulfides, combinations thereof, or mixtures of metals and one or more of these materials can also be used as reflective materials.

The thickness of the reflector layers can be in a range from about 10 nm to about 150 nm, although this range should not be taken as restrictive. For example, the lower limit of about 10 nm is selected for a reflector layer so that the reflector layer is semi-transparent. As the thickness of the reflector layer is increased, the reflector layer becomes more opaque. The upper limit of about 150 nm is selected primarily to maintain a high aspect ratio of diameter to thickness in the final pigment. Even greater thicknesses could be acceptable for some purposes. In a more preferred range, the thickness of the reflector layer is from about 80 nm to about 150 nm. With respect to the lower limit of about 80 nm, this limit is selected to obtain a substantially opaque thickness for an aluminum layer for the purpose of facilitating reflectance.

Depending on the nature of the reflector layers, additional protective layers 17 and 19 may be applied on top of the reflector layers forming the outer surfaces of core flake sections, as described above. The protective layers can be composed of dielectric materials such as those described above for the central support layer. Alternatively, the protective layers can be composed of organic materials which have significant vapor and gas barrier properties, such as PARYLENE, a polymer of para-xylylene, or other copolymers synthesized from monomers that contain a xylylene functional group.

The thickness of the protective layers can be in a range from about 10 nm to about 150 nm, although this range should not be taken as restrictive. The range of coating thickness for the protective layers is subject to variation based upon the actual reflector layers used and the coating material chosen. With an aluminum reflector layer and either silicon dioxide, silicon monoxide, or magnesium fluoride for the protective layer, the lower thickness limit of about 10 nm for the protective layer is selected based upon the deposition in order to form a continuous protective coating, beyond which, when smaller, will not offer sufficient prevention of adverse reaction with a surrounding media in the final application, or in subsequent coating processes. The upper limit of about 150 nm is selected based upon the observation that color interference between protective support layers commences at thicknesses beyond 150 nm. In situations where color interference is useful, thicker support layers may be used.

It should be recognized that the thickness of the central support layer can be reduced if protective layers of increased thickness are employed. The materials and processes used to form the central support layer can be selected primarily on the basis of economical and efficient manufacturing. When the central, reflective, and protective layers are deposited on a web substrate for later removal and commutation to form core flake particulates, the central support layer can be reduced in thickness substantially as the protective layers are proportionately increased in thickness because the precursor core flake film is not subject to stress until the core flake film is released from the web substrate.

Despite the exceedingly small thickness of the composite reflective flakes of the invention, it has been surprisingly discovered that a flake having the three-layered structure of core flake section 10 has sufficient rigidity for use as a highly reflective pigment, primarily because of the inherent uniaxial strength of the central support layer. For example, a dielectric support layer of silicon dioxide, which has a uniaxial compressive strength of about 160,000 (lb/in$^2$) and a uniaxial tensile strength of about 7000 (lb/in$^2$), prevents the reflector layers from flexing, bowing or otherwise deforming. Aluminum has a tensile strength approximately equal to its compressive strength. Yet when aluminum layers are formed on a dielectric support layer according to the present invention, the uniaxial compressive strength (lb/in$^2$) of the core flake section is surprisingly about 8 times greater than the uniaxial tensile strength (lb/in$^2$). This surprising result is empirically supported under the well known theory of brittle fracture, known as Griffith's theory. This substantial difference in strengths beneficially transforms an aluminum layer, which normally fractures only after plastic deformation, to undergo a brittle mode of fracture without plastic deformation.

In a preferred brittleness range, the reflector layers are satisfactorily strengthened by the support layer when the uniaxial compressive strength of the core flake section is at least about 6 times higher than the uniaxial tensile strength. Although the core flake section can have a compressive strength in amounts less than about 6 times the tensile strength, the flake then tends to exhibit adverse fracture characteristics similar to those of ductile fractures.

The brittle fracture characteristics advantageously serve to facilitate the separation of a plurality of composite reflective flakes from a larger film or to selectively reduce the particle size for a specific application during manufacturing processes, and to facilitate the fracture of individual flakes as stresses are imposed during use.

The composite reflective flakes of the present invention may be of a nonuniform or uniform shape depending on the manufacturing process and desired end use. Nevertheless, for purpose of brevity, the flakes will be referred to as having a "diameter" regardless of flake shape or uniformity. In a presently preferred embodiment, the diameter of the flakes are in a range of about 1–100 microns, and more preferably a range of about 5–25 microns. The aspect ratio of flake diameter to flake thickness for the flakes of the present invention is in a range of about 6.5–625, and preferably a range of about 50–250. As is well known, the greater the aspect ratio, the flatter the flakes will lie, hence increasing reflectance. Since many prior pigments and/or flakes have an optimal aspect ratio of only about 15, it should be apparent that the aspect ratio of the flakes of the present invention will inherently yield substantially improved reflectance properties.

A first method for fabricating the flake-based pigment of the invention first involves the process of manufacturing core flake section 10. A first reflector layer 12 is formed on an upper surface of web 11 as shown in FIG. 1A, and central support layer 14 is formed on reflector layer 12, by conventional deposition processes such as physical vapor deposition (PVD). The web 11 is made of a flexible material which can be employed in a conventional roll coater apparatus. A second reflector layer 16 is then formed on central support layer 14 by a deposition process to complete a core flake film having substantial rigidity so as to provide high reflectance. The core flake film is then removed from web 11 in order to produce a plurality of composite reflective flakes. Alternatively, prior to removal from web 11 via a soluble release layer (not shown), additional protective layers and/or thin film layers can be formed on core flake section 10, such as shown in FIGS. 1B and 1C, by conventional deposition processes. Thereafter, one or more thin film coating layers can be formed around the composite reflective flakes to produce various pigment products, as discussed in further detail below.

The deposition of the central support layer is preferably accomplished by a conventional vapor deposition process such that the support layer will crack under the stresses imposed as the support layer transitions from the vapor phase into the solid phase. The deposited reflector layers take on the characteristics of the cracked support layer. In this manner, the support layer bolsters the flimsy and thin reflector layers into a rigid reflector film possessing characteristics tending to fracture the reflector layers along the cracks of the support layer in a brittle, instead of ductile, manner. Thereafter, as the flexible web is removed, either by dissolution in a preselected liquid or by release agents, both well known in the art, a plurality of composite reflector flakes are fractured out according to the cracks of the support layer. This type of manufacturing technique is similar to that more fully described in U.S. Pat. No. 5,135,812 to Phillips et al., which is expressly incorporated herein by reference.

Once manufactured, each individual composite reflector flake possesses exceptional planar characteristics which allow each flake to be extremely flat and smooth even in the vicinity of the fracture. In turn, this flat and smooth feature allows the further deposition of thin film coating layers without compounding surface deformities, unlike prior pigments having rough or non-planar flake sections.

The composite reflector flakes are ground into sizes appropriate for the desired application. Once ground, various additional thin film coating layers are deposited on the core flake sections, depending upon the desired optical performance of the pigment as it is used in an application, to form the flake-based pigments of the present invention. It should be noted that pigment flakes containing inorganic dielectrics can be ground to size at any stage during manufacture, whereas pigment flakes containing organic dielectrics are preferably ground to final application size before the organic dielectrics are applied.

Although the foregoing description relates to making composite reflective flakes with dual reflector layers on opposing sides, it is contemplated that a reflector layer can also be coated upon a single side of the central support layer and still achieve favorable properties during manufacture and use. The single reflector layer coating, however, will typically require stress balancing by techniques well known to those skilled in the art to prevent curling of the flake. The dual reflector layer flake, however, is the preferred embodiment for the core flake section to satisfactorily improve flake rigidity and to promote the symmetry useful during manufacturing processes.

In alternative manufacturing processes, the central support layer comprises a preformed particle, with the reflective layers being deposited by a variety of methods, such as electroless metal plating, chemical vapor deposition or physical vapor deposition, where the particles are disbursed in a liquid, gaseous or vacuum environment during the coating process. It should be noted that when flakes are made by these processes, the central support layer must have a sufficient thickness to maintain the core flake rigidity during such processes.

Various alternative embodiments of the flake-based pigment of the invention having a core portion of a composite reflective flake (CRF) with additional coatings therearound will be discussed in detail as follows.

Figure 2A:
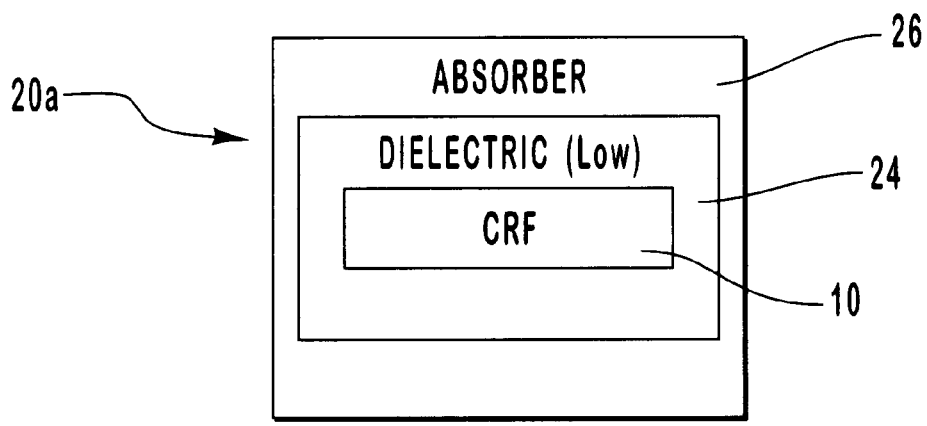
FIGS. 2A and 2B are schematic cross-sectional views of flake-based pigment particles according to alternative embodiments of the present invention.

FIG. 2A shows a cross-sectional view of a flake-based pigment particle 20a according to one embodiment of the present invention, which has a core flake section 10 of a CRF. A first dielectric coating 24 is formed to substantially surround or encapsulate core flake section 10. The dielectric coating 24 is composed of a material having a "low" index of refraction, which is defined herein as an index of refraction of about 1.65 or less. Suitable low index materials for dielectric coating 24 include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (TEFLON), fluorinated ethylene propylene (FEP), combinations thereof, and the like. The dielectric coating 24 is preferably formed to have an optical thickness of a plurality of halfwaves at a particular design wavelength, with a physical thickness in a range from about 50 nm to about 800 nm, preferably from about 72 nm to about 760 nm, and more preferably from about 200 nm to about 600 nm.

A first absorber coating 26 is formed to substantially surround or encapsulate dielectric coating 24. Suitable materials for absorber coating 26 include all metals or metal compounds, or other materials, which have uniform absorption or selective absorption in the visible spectrum. Examples of such materials include chromium, nickel, iron, titanium, aluminum, tungsten, molybdenum, niobium, carbon, and silicon; sulfides, nitrides, phosphides and oxides of metals; combinations or alloys thereof, such as Inconel (Ni—Cr—Fe); metals mixed in a dielectric matrix; absorbing dielectric materials such as iron oxide (e.g., $Fe_2O_3$), silicon monoxide (SiO), chromium oxide ($Cr_2O_3$), carbon, titanium nitride (TiN), titanium sub-oxide ($TiO_x$, where x is less than 2.0), combinations thereof, and the like; or other substances that are capable of acting as a uniform or selective absorber in the visible spectrum. These absorbing substances preferably have a ratio of the real component of the refractive index (n) to the imaginary component of the refractive index, the extinction coefficient (k), that satisfies the relationship: $0.1 < n/k < 10$. The absorber coating 26 is preferably formed to have a physical thickness in a range from about 2 nm to about 80 nm, and more preferably from about 3 nm to about 30 nm. It should be appreciated, however, that still other thicknesses for the dielectric and absorber coating layers are contemplated for altering the optical performance of the pigment.

It should be understood that the absorber coating at thin thicknesses does not need to be continuous to still work as an optical absorber. For example, a plurality of islands or dots of absorber material can suffice as an absorber.

The dielectric coating 24 and absorber coating 26 are formed around core flake section 10 of pigment particle 20a by conventional coating processes. For example, suitable preferred methods for forming the dielectric coating include, but are not limited to, vacuum vapor deposition, sol-gel hydrolysis, chemical vapor deposition (CVD) in a fluidized bed, electrochemical deposition, and polymerizing an organic monomer on the surface of the flake. Suitable methods for forming the absorber coating include, but are not limited to, vacuum vapor deposition, sputtering onto a mechanically vibrating bed of particles, as disclosed in commonly assigned co-pending patent application Ser. No. 09/389,962, filed Sep. 3, 1999, entitled "Methods and Apparatus for Producing Enhanced Interference Pigments," which is incorporated by reference herein in its entirety. Alternatively, the absorber coating may be deposited by decomposition through pyrolysis of metal-organo compounds or related CVD processes which may be carried out in a fluidized bed as described in U.S. Pat. Nos. 5,364,467 and 5,763,086 to Schmid et al., the disclosures of which are incorporated by reference herein. If no further grinding is carried out, these methods result in an encapsulated core flake section with dielectric and absorber materials therearound. Various combinations of the above coating processes may be utilized during manufacture of pigment flakes with multiple coatings therearound.

Figure 2B:
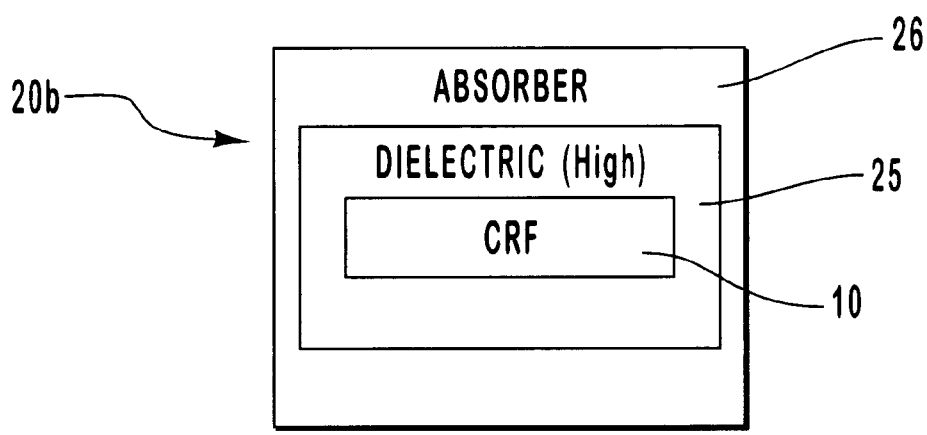

FIG. 2B is a cross-sectional view of a flake-based pigment particle 20b according to an alternative embodiment of the present invention. The pigment particle 20b includes similar components as pigment particle 20a discussed above, including a core flake section 10 of a CRF. A first dielectric coating 25 is formed to substantially surround or encapsulate core flake section 10. The dielectric coating 25 is composed of a material having a "high" index of refraction, which is defined herein as an index of refraction of greater than about 1.65. Suitable high index materials for dielectric coating 25 include zinc sulfide (ZnS), zinc oxide (ZnO), zirconium oxide ($ZrO_2$), titanium dioxide ($TiO_2$), carbon, indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), combinations thereof; and the like. The dielectric coating 25 is preferably formed to have a physical thickness in a range from about 50 nm to about 800 nm, and more preferably from about 72 nm to about 760 nm.

An absorber coating 26 is formed to substantially surround or encapsulate dielectric coating 25. The absorber coating 26 can be formed of the same materials and in the same thickness ranges as discussed above with respect to particle 20a. The dielectric coating 25 and absorber coating 26 can be formed around core flake section 10 by the same conventional coating processes as discussed above with respect to particle 20a.

Figure 3A:
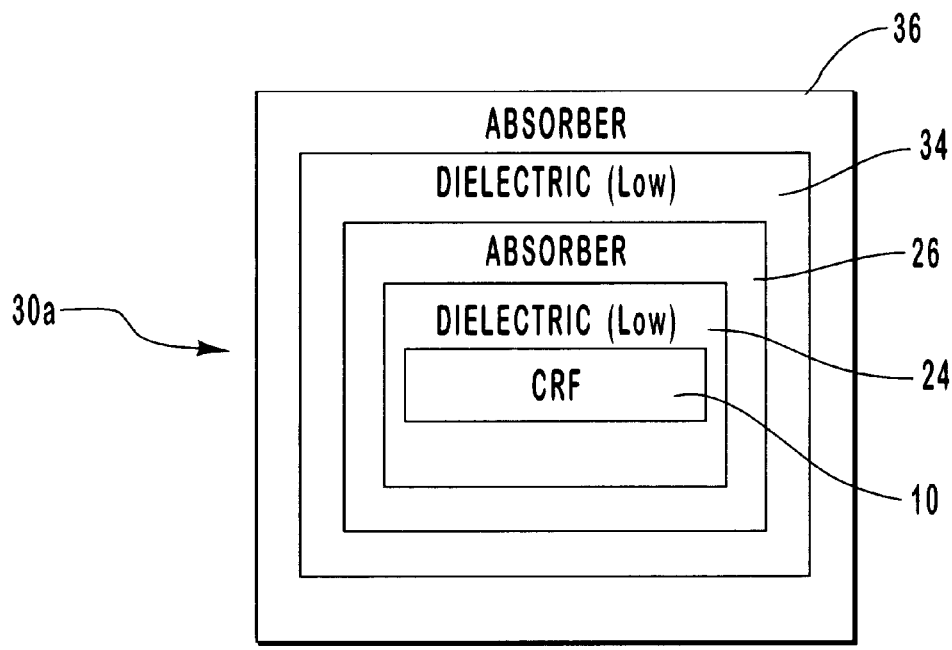
FIGS. 3A–3D are schematic cross-sectional views of flake-based pigment particles according to further alternative embodiments of the present invention.
Figure 3B:
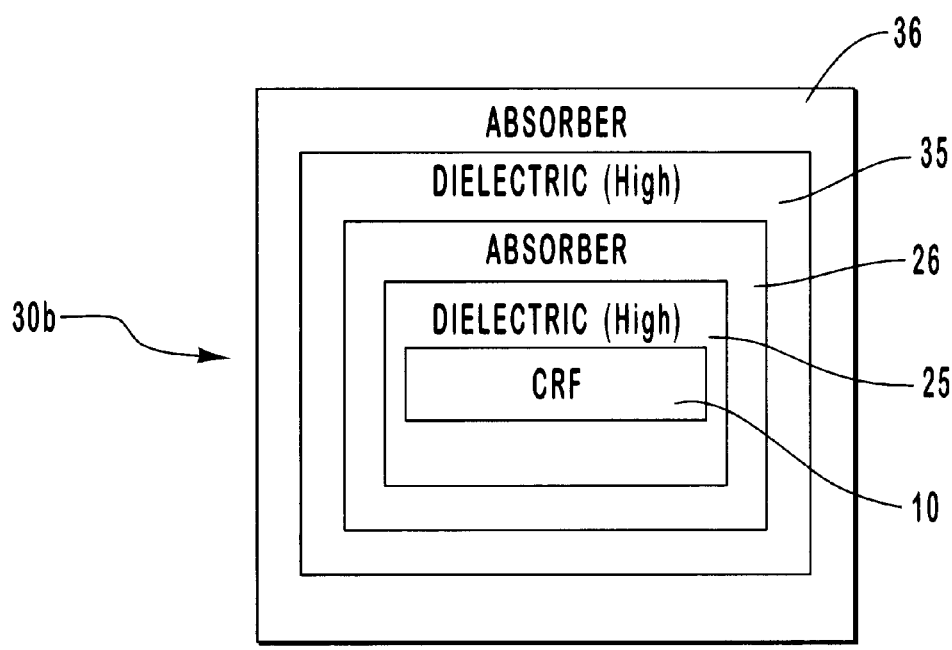

FIGS. 3A–3D are cross-sectional views of flake-based pigment particles according to further alternative embodiments of the present invention. As shown in FIG. 3A, a pigment particle 30a has an interior structure of the same components as discussed above for particle 20a. These include a core flake section 10 of a CRF, a first dielectric coating 24 of a low index material formed around core flake section 10, and a first absorber coating 26 formed around dielectric coating 24. The pigment particle 30a additionally includes a second dielectric coating 34 of a low index material formed around absorber coating 26, and a second absorber coating 36 formed around dielectric coating 34. The first and second dielectric coatings have an index of refraction of about 1.65 or less. The additional dielectric and absorber coatings can be formed of the same materials and in the same thickness ranges as discussed above with respect to particle 20a, by the above conventional coating processes. FIG. 3B depicts a pigment particle 30b according to an alternative embodiment of the invention. The pigment particle 30b has an interior structure of the same components as discussed above for particle 20b. These include a core flake section 10 of a CRF, a first dielectric coating 25 of a high index material formed around core flake section 10, and a first absorber coating 26 formed around dielectric coating 25. The pigment particle 30b additionally includes a second dielectric coating 35 of a high index material formed around absorber coating 26, and a second absorber coating 36 formed around dielectric coating 35. The first and second dielectric coatings have an index of refraction of greater than about 1.65. The additional dielectric and absorber coatings can be formed of the same materials and in the same thickness ranges as discussed above with respect to particle 20b, by the above conventional coating processes.

Figure 3C:
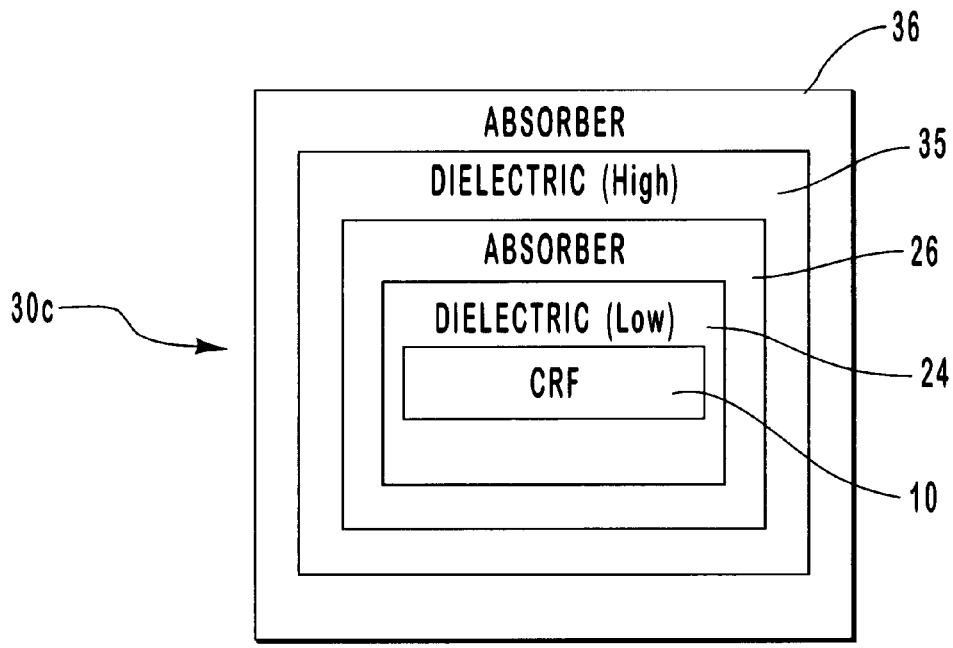

A pigment particle 30c according to a further alternative embodiment of the invention is depicted in FIG. 3C. The pigment particle 30c has essentially the same structure as particle 30a discussed above, except that a second dielectric coating 35 of a high index material is formed around absorber coating 26. Thus, dielectric coating 24 has an index of refraction of about 1.65 or less, and dielectric coating 35 has an index of refraction of greater than about 1.65.

Figure 3D:
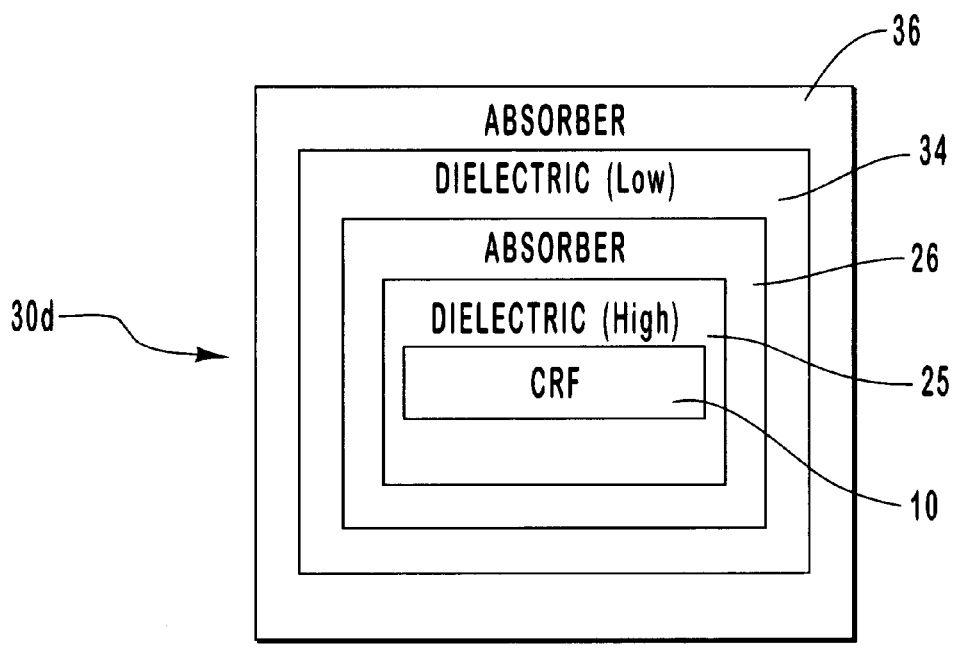

FIG. 3D depicts a pigment particle 30d according to another alternative embodiment of the invention. The pigment particle 30d has essentially the same structure as particle 30b discussed above, except that a second dielectric layer 34 of a low index material is formed around absorber coating 26. Thus, dielectric coating 25 has an index of refraction of greater than about 1.65, and dielectric coating 34 has an index of refraction of about 1.65 or less.

Figure 4A:
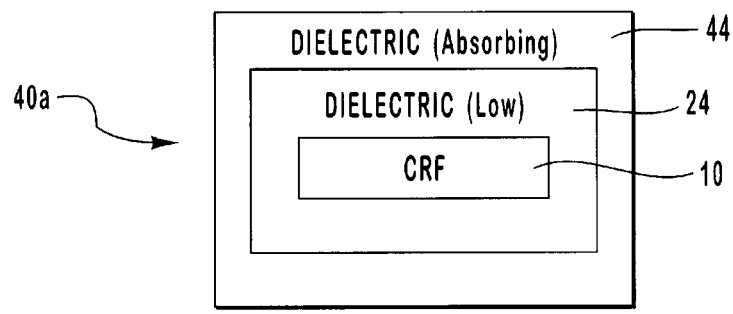
FIGS. 4A and 4B are schematic cross-sectional views of flake-based pigment particles according to other alternative embodiments of the present invention.
Figure 4B:
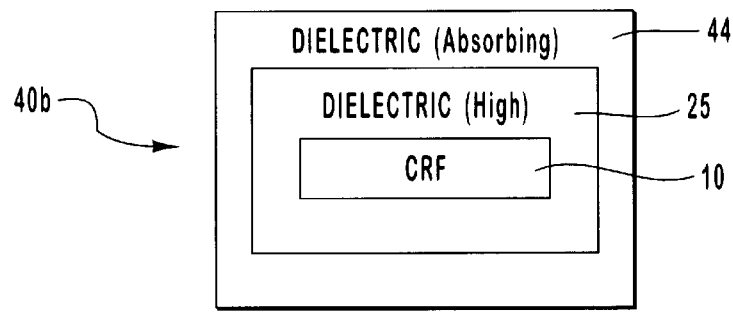

FIGS. 4A and 4B are schematic cross-sectional views of flake-based pigment particles according to other alternative embodiments of the present invention. As shown in FIG. 4A, a pigment particle 40a has an interior structure of the same components as the interior structure of particle 20a in FIG. 2A. These include a core flake section 10 of a CRF, and a first dielectric coating 24 of a low index material formed around core flake section 10. In addition, pigment particle 40a includes a second dielectric coating 44 substantially surrounding first dielectric coating 24. The second dielectric coating 44 is composed of an absorbing dielectric material, which is selectively absorbing over specific wavelengths of interest, such as an iron oxide (e.g., $Fe_2O_3$), silicon monoxide, chromium oxide, carbon, titanium nitride, titanium sub-oxide ($TiO_x$, where x is less than 2.0), combinations thereof, and the like.

FIG. 4B depicts a pigment particle 40b with an interior structure of the same components as the interior structure of particle 20b in FIG. 2B. These include a core flake section 10 of a CRF, and a first dielectric coating 25 of a high index material formed around core flake section 10. In addition, pigment particle 40b includes a second dielectric coating 44 of an absorbing material, such as discussed above, substantially surrounding first dielectric coating 25.

The dielectric coatings in the embodiments of FIGS. 4A and 4B can be formed by the conventional coating processes discussed above.

Figure 5A:
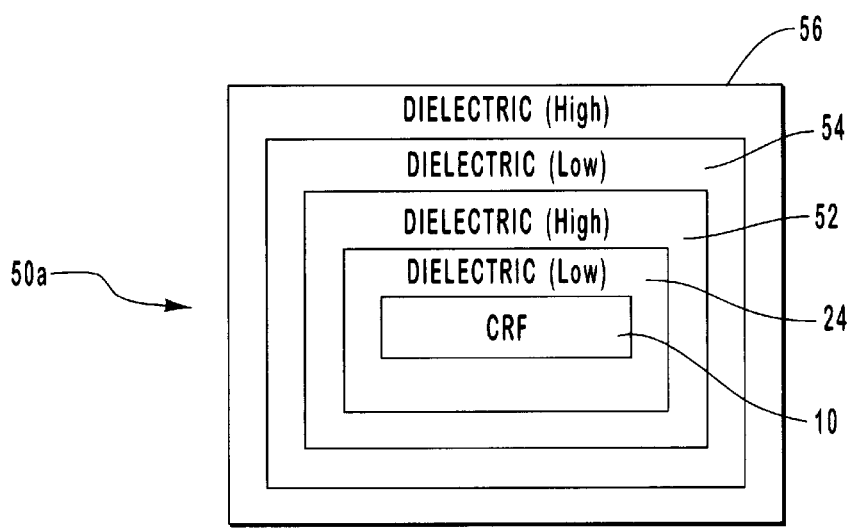
FIGS. 5A and 5B are schematic cross-sectional views of flake-based pigment particles according to further alternative embodiments of the present invention.
Figure 5B:
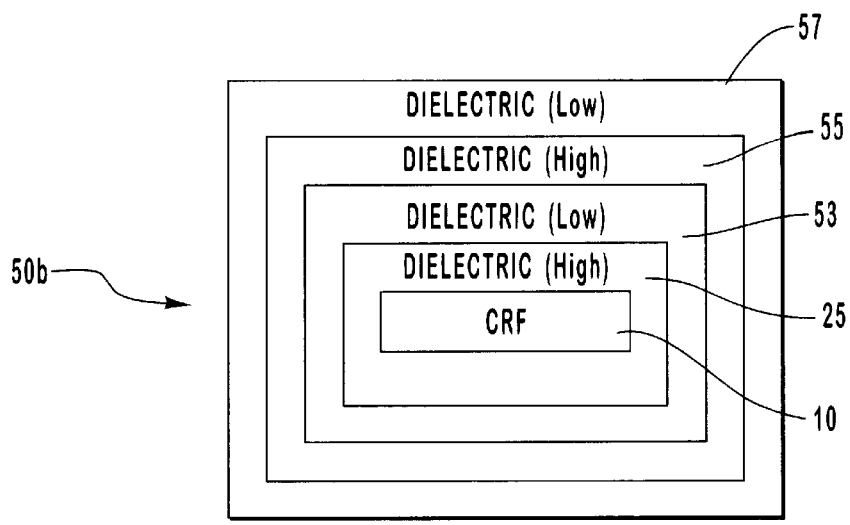

FIGS. 5A and 5B are schematic cross-sectional views of flake-based pigment particles according to additional alternative embodiments of the invention, which are formed with alternating high and low index coatings. As shown in FIG. 5A, a pigment particle 50a has an interior structure of the same components as the interior structure of particle 40a in FIG. 4A. These include a core flake section 10 of a CRF, and a first dielectric coating 24 of a low index material formed around core flake section 10. In addition, pigment particle 50a includes a second dielectric coating 52 of a high index material substantially surrounding first dielectric coating 24, a third dielectric coating 54 of a low index material substantially surrounding second dielectric coating 52, and a fourth dielectric coating 56 of a high index material substantially surrounding third dielectric coating 54.

As shown in FIG. 5B, a pigment particle 50b has an interior structure of the same components as the interior structure of particle 40b in FIG. 4A. These include a core flake section 10 of a CRF, and a first dielectric coating 25 of a high index material formed around core flake section 10. In addition, pigment particle 50b includes a second dielectric coating 53 of a low index material substantially surrounding first dielectric coating 25, a third dielectric coating 55 of a high index material substantially surrounding second dielectric coating 53, and a fourth dielectric coating 57 of a low index material substantially surrounding third dielectric coating 55.

The additional high and low index dielectric coatings in the embodiments of FIGS. 5A and 5B can be formed of the same materials and in the same thickness ranges as discussed above with respect to the dielectric coatings of particles 20a and 20b, by the above conventional coating processes.

The above described pigment particle embodiments of the invention (FIGS. 2A–5B) are particularly useful in preparing pigments with color shifting properties, non-shifting color pigments, pigments with color enhancement properties, high reflectance properties, magnetic properties, and colored metallics. For example, use of high index dielectric materials for the coating layers can produce pigments with pure colors, while use of low index dielectric materials can produce pigments with color shifting properties.

Figure 6:
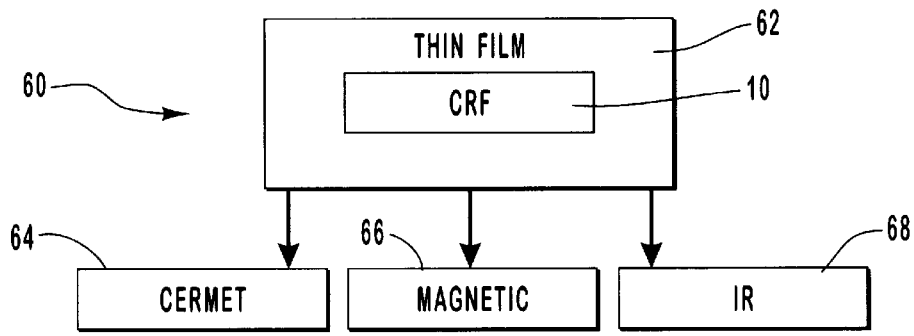
FIG. 6 is a schematic cross-sectional view of a flake-based pigment particle showing other alternative embodiments of the present invention.

FIG. 6 is a cross-sectional view of a flake-based pigment particle 60 showing other alternative embodiments of the invention. The pigment particle 60 includes a core flake section 10 of a CRF, and a thin film coating 62 formed on core flake section 10. The thin film coating 62 can be formed of a variety of different materials of one or more layers. The thin film coating 62 is formed to have a thickness of from about 3 nm to about 4000 nm (4 $\mu$m), preferably from about 50 nm to about 800 nm, and more preferably from about 200 nm to about 600 nm, by conventional coating processes such as those discussed above.

In one embodiment, the thin film coating 62 can be a cermet (ceramic-metal) material 64, which provides selective solar absorption properties to the pigment. In a patent application of H. Gurev, entitled "Selective Solar Absorber and Structure Incorporating the Same" (U.S. Ser. No. 86,076, filed Oct. 18, 1979, now abandoned), materials and approaches for forming cermet materials are exemplified. The foregoing abandoned application is expressly incorporated herein by reference.

In another embodiment, the thin film coating 62 can be at least one layer of a magnetic material 66. The magnetic coating can be used to produce a magnetic color shifting pigment useful in applications such as credit cards, checks, or bar code patterns. One preferred magnetic coating design is a symmetrical application of a cobalt-nickel alloy, with the cobalt and nickel having a ratio by weight of 80% and 20%, respectively, which is deposited about core flake section 10. Further magnetic color shifting coating layers useful for application with core flake section 10 are described in U.S. Pat. No. 4,838,648, expressly incorporated herein by reference.

In a further embodiment, thin film coating 62 of pigment particle 60 can be composed of at least one layer of an infrared light (IR) reflecting material 68. Suitable IR reflecting materials include oxides of indium containing various dopants, such as tin, antimony, aluminum, and the like; europium oxide ($Eu_2O_3$), vanadium pentoxide ($V_2O_5$), rhenium oxide ($ReO_3$), lanthanum boride ($LaB_6$), combinations thereof, and the like.

Figure 7:
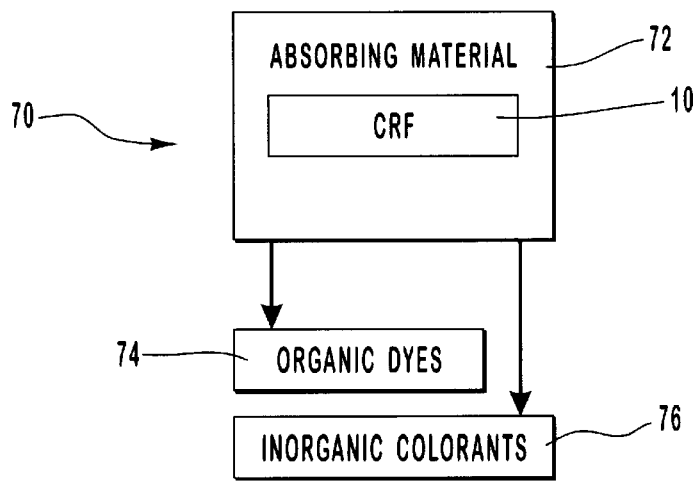
FIG. 7 is a schematic cross-sectional view of a flake-based pigment particle showing further alternative embodiments of the present invention.

FIG. 7 is a cross-sectional view of a flake-based pigment particle 70 showing other alternative embodiments of the invention. The pigment particle 70 includes a core flake section 10 of a CRF, and a coating 72 of a radiation absorbing material (e.g., visible or IR radiation) formed on core flake section 10. The coating 72 can be formed of a variety of different absorbing materials in one or more layers. Preferably, coating 72 is formed to have a thickness of from about 3 nm to about 400 nm, and more preferably from about 50 nm to about 200 nm, by conventional coating processes such as those discussed above.

In one embodiment, coating 72 can be formed of an organic dye material 74. Examples of suitable organic dyes include copper phthalocyanine, perylene, anthraquinones, and the like; azo dyes and azo metal dyes such as aluminum red RLW, aluminum copper, aluminum bordeaux RL, aluminum fire-red ML, aluminum red GLW, aluminum violet CLW, and the like; as well as combinations or mixtures thereof.

In another embodiment, coating 72 can be formed of aluminum oxide or silicon dioxide applied by a sol-gel process, with organic dyes absorbed into pores of the sol-gel coating or bound to the surface of the coating. Suitable organic dyes used in the sol-gel coating process include those available under the trade designations Aluminiumrot GLW (aluminum red GLW) and Aluminiumviolett CLW (aluminum violet CLW) from the Sandoz Company. Aluminum red GLW is an azo metal complex containing copper, and aluminum violet CLW is a purely organic azo dye. Examples of sol-gel coating techniques useful in the present invention are disclosed in the following: U.S. Pat. No. 4,756,771 to Brodalla (1988); Zink et al., *Optical Probes and Properties of Aluminosilicate Glasses Prepared by the Sol-Gel Method*, Polym. Mater. Sci. Eng., 61, pp. 204–208 (1989); and McKiernan et al., *Luminescence and Laser Action of Coumarin Dyes Doped in Silicate and Aluminosilicate Glasses Prepared by the Sol-Gel Technique*, J. Inorg. Organomet. Polym., 1 (1), pp. 87–103 (1991). The disclosures of all of these are incorporated herein by reference.

In a further embodiment, coating 72 can be formed of an inorganic colorant material 76. Suitable inorganic colorants include titanium nitride, chromium nitride, chromium oxide, iron oxide, cobalt-doped alumina, combinations or mixtures thereof, and the like. The organic dyes and inorganic colorants can be used to achieve pigments with bright colors.

Various modifications and combinations of the foregoing embodiments are also considered within the scope of the invention. For example, additional dielectric, absorber, and/or other optical coatings can be formed around each of the above particle embodiments, or on a composite reflective film prior to flake formation, to yield further desired optical characteristics.

The various coating layers applied to the composite reflective flakes according to the embodiments of the invention can be applied by a variety of coating processes such as described above. In addition, various coating processes and apparatus which are suitable for use in forming the coating layers in the present invention are described in detail in copending application Ser. No. 09/389,962, supra.

It will be understood by those skilled in the art that the various coating layers are formed on the composite reflective flakes such that adjacent coating layers are generally composed of different materials. For example, in a composite reflective flake encapuslated by a first dielectric layer and an adjacent second dielectric layer or absorber layer, the first dielectric layer will be composed of a material that is different from the material of the second dielectric layer or absorber layer.

The flake-based pigments of the invention are useful in a variety of applications such as paints, inks, coating compositions, extrusions, electrostatic coatings, glass, and ceramics. For example, the pigments of the invention may be easily and economically utilized in colorants for various applications by interspersing the pigment flakes into liquid media used as paints or inks, which can subsequently be applied to various objects.

Alternatively, the pigment flakes of the invention can be preblended with other additive flakes to achieve a desired color by adding flakes of different hues, chroma and brightness. For example, the flakes of the invention can be mixed with other conventional pigments, either of the interference type or noninterference type, to produce a range of other colors. The flakes of the invention can be combined with high chroma or highly reflective platelets to produce unique color effects, such as $MgF_2/Al/MgF_2$ platelets or $SiO_2/Al/SiO_2$ platelets. Other suitable additives that can be blended with the pigment flakes of the invention include lamellar pigments such as aluminum flakes, graphite flakes, glass flakes, iron oxide flakes, boron nitride flakes, mica flakes, interference based $TiO_2$ coated mica flakes, interference pigments based on multiple coated platelike silicatic substrates, metal-dielectric or all dielectric interference pigments, and the like, as well as non-lamellar pigments such as aluminum powder, carbon black, ultramarine blue, cobalt based pigments, organic pigments or dyes, rutile or spinel based inorganic pigments, naturally occurring pigments, inorganic pigments such as titanium dioxide, talc, china clay, and the like, as well as various mixtures thereof. The preblended flakes can then be dispersed into a polymeric medium such as a paint, ink, or other polymeric pigment vehicle for use in a conventional manner.

Colorants such as paints and inks which employ the pigments of the invention can be applied to many different objects and papers. Examples of such objects and papers include motorized vehicles, currency and security documents, household appliances, architectural structures, flooring, sporting goods, fabrics, electronic packaging/housing, toys, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A colorant composition, comprising:

a polymeric medium; and a plurality of composite reflective flakes dispersed in the polymeric medium and having one or more coating layers formed therearound, each of the composite reflective flakes comprising:

a central support layer having a first major surface, an opposing second major surface, and at least one side surface, the support layer having a thickness in a range of about 50 nm to about 1000 nm; and a reflector layer on each of the first and second major surfaces of the support layer but not on the at least one side surface, each reflector layer having a thickness in a range of about 10 nm to about 150 nm.

2. The colorant composition of claim 1, wherein the one or more coating layers comprise at least one dielectric coating substantially surrounding each of the composite reflective flakes, and at least one absorber coating substantially surrounding the dielectric coating.

3. The colorant composition of claim 1, wherein the one or more coating layers comprise a first dielectric coating substantially surrounding each of the composite reflective flakes, and a second dielectric coating substantially surrounding the first dielectric coating.

4. The colorant composition of claim 1, further comprising an additive marterial.

5. The colorant composition of claim 1, wherein the polymeric medium is a paint or ink.

* * * * *